C. BEALE & D. P. MOORE.
FLEXIBLE JOINTED CLUTCH.
APPLICATION FILED OCT. 3, 1908. RENEWED JUNE 10, 1911.

1,015,259.

Patented Jan. 16, 1912.

Inventors
CARROLL BEALE
AND DAVID P. MOORE

Witnesses

UNITED STATES PATENT OFFICE.

CARROLL BEALE AND DAVID P. MOORE, OF WASHINGTON, DISTRICT OF COLUMBIA.

FLEXIBLE JOINTED CLUTCH.

1,015,259.  Specification of Letters Patent.  Patented Jan. 16, 1912.

Application filed October 3, 1908, Serial No. 456,022. Renewed June 10, 1911. Serial No. 632,472.

*To all whom it may concern:*

Be it known that we, CARROLL BEALE and DAVID P. MOORE, citizens of the United States, residing at Washington, in the District of Columbia, have invented certain new and useful Improvements in Flexible Jointed Clutches, of which the following is a specification, reference being had therein to the accompanying drawing.

This invention relates to an improved flexible jointed clutch, the main object of which is to produce a clutch, which will transmit motion in either direction, and so mount the free member as to allow of a slight tilting or gyroscopic motion, whereby the machine furnishing the motion through the clutch to the mechanism to be affected, is in no way affected, should the intervening parts be slightly out of alinement.

To clearly illustrate our particular construction, attention is invited to the accompanying drawings, in which:—

Figure 1:
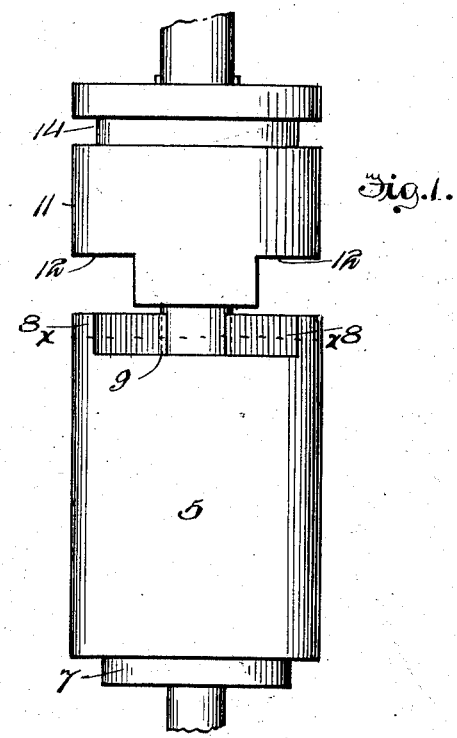
Figure 2:
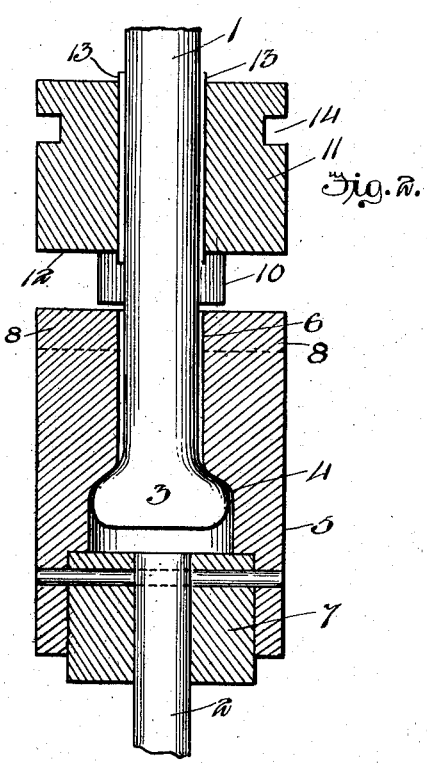
Figure 3:
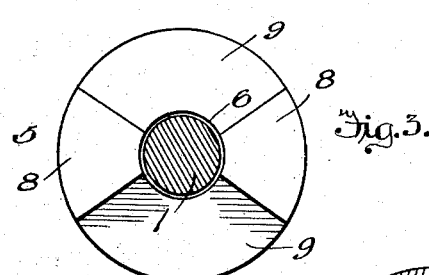
Figure 4:
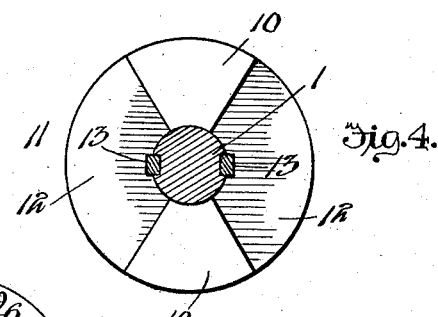
Figure 5:
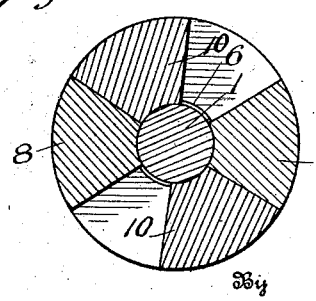

Figure 1 is a side elevation of the complete clutch in the position it assumes when not in use. Fig. 2 is a vertical central section thereof. Fig. 3 is a top plan view of the lower member of the clutch. Fig. 4 is a bottom plan view of the upper member of the clutch, and Fig. 5 is a section on line *x—x*, Fig. 1, looking in the direction of the arrow, the members being in operative position.

Referring to the drawings:—The numeral 1 designates the driving shaft, and 2, the driven shaft, to which motion it is to be transmitted.

The lower end of the shaft 1, is provided with the rounded or ball end 3, which is adapted to fit in the socket 4, of the lower member 5, of the clutch, the shaft fitting loosely in the bore 6, thereof, so that the lower member of the clutch, can have a slight tilting motion in any direction, so that said tilting or gyroscopic motion will in no way affect the shaft 1, which at all times remains in the same position. Mounted or keyed in the lower end of the member 5, is the plug 7, which carries the driven shaft 2. The upper face of the member 5, is provided with the oppositely arranged dove-tail shaped lugs or bosses 8, which provide the large recesses 9, for the reception of the dove-tail shaped lugs or bosses 10, carried upon the lower face of the upper clutch member 11, this member being also provided with the enlarged recesses 12, similar to the recesses 9, of the lower member. When the clutch is not in use, the upper member assumes the position, shown in Figs. 1 and 2, but when in use the members are brought together by causing the upper member to slide upon the shaft 1, until its lugs fit in the recesses of the lower member, and vice versa, and as soon as the lugs of each member engage as shown in Fig. 5, the lower member and its shaft 2, are turned in the same direction as the shaft 1. The upper member is held upon the shaft by means of the two oppositely arranged keys 13, which permit the member to have a sliding movement to or from the lower member, but cause the same to at all times revolve with the shaft 1. The annular groove 14 is provided in the upper member for the reception of an operating lever, not shown.

What we claim, as new, is:—

1. In combination with a shaft adapted to be rotated but remain in the same relative position, and another shaft adapted to have a slight gyroscopic motion, of a clutch for transmitting motion from the first to the second shaft, comprising two members, one slidably carried upon and surrounding the first shaft and the other loosely mounted upon and incasing the lower end of the first shaft and secured to the second shaft, whereby when the two members coact, power is transmitted through the two members of the clutch to the second shaft so that the gyroscopic motion is taken care of between the members of the clutch without affecting the first shaft.

2. In combination with a shaft having a ball upon one end, of a clutch, comprising two members, one of which is carried upon said ball end of the shaft in such a manner as to allow the shaft to rotate freely therein and allow the member a tilting motion, and another member slidably mounted upon said shaft and adapted to rotate at all times with said shaft, each of the members being provided with co-acting means which when the members are together cause the shaft to rotate the free member through the fast member.

3. In combination with a shaft having a ball upon one end, said shaft being adapted to retain its relative position, and another shaft which may at times be out of alinement and have a tilting motion with relation to the first shaft, of a clutch for transmitting motion from the first to the second shaft and comprising, a member mounted upon the ball end of the first shaft and rigidly connected to the second shaft so that the first shaft may rotate without affecting the second shaft, and another member slidable, yet adapted to rotate with the first shaft, both of said members having co-acting means, which are adapted to be brought together to cause the members to engage and thereby transmit motion from the first to the second shaft.

4. A clutch, comprising a lower member having a socket, a shaft having a ball thereon fitted in said socket so that the shaft may rotate freely in the member and the member be allowed to tilt in various directions, another member slidably mounted upon said shaft but adapted to at all times rotate therewith, and co-acting means carried by the opposed faces of the members adapted to engage, as and for the purpose set forth.

In testimony whereof we affix our signatures in presence of two witnesses.

CARROLL BEALE.
DAVID P. MOORE.

Witnesses:
G. M. SPRING,
A. M. PARKINS.

Copies of this patent may be obtained for five cents each, by addressing the "Commissioner of Patents, Washington, D. C."